United States Patent [19]

Lu

[11] Patent Number: 5,963,561

[45] Date of Patent: Oct. 5, 1999

[54] METHOD AND APPARATUS FOR BANDWIDTH REUSE IN A COMMUNICATION NETWORK

[75] Inventor: Xiaolin Lu, Matawan, N.J.

[73] Assignee: AT&T Corp., New York, N.Y.

[21] Appl. No.: 08/760,790

[22] Filed: Dec. 5, 1996

[51] Int. Cl.$^6$ ................................. H04J 1/08; H04J 3/00
[52] U.S. Cl. ........................................... 370/458; 370/498
[58] Field of Search .................................... 370/319, 343, 370/330, 480, 276, 280, 281, 481, 482, 484, 436, 293–295, 478, 458, 498; 455/447

[56] References Cited

U.S. PATENT DOCUMENTS

| | | | |
|---|---|---|---|
| 3,710,255 | 1/1973 | Gicca | 455/13.1 |
| 4,528,656 | 7/1985 | Morais | 370/30 |
| 5,550,578 | 8/1996 | Hoarty et al. | 370/486 |
| 5,579,308 | 11/1996 | Humpleman | 370/58.1 |
| 5,594,720 | 1/1997 | Papadopoulos et al. | 370/330 |
| 5,680,394 | 10/1997 | Bingham et al. | 370/294 |
| 5,793,416 | 8/1998 | Rostoker et al. | 348/17 |

*Primary Examiner*—Melvin Marcelo
*Assistant Examiner*—Jasper Kwoh

[57] ABSTRACT

A method and apparatus is provided within a system having a total bandwidth divided into multiple segments. The segments are preferably frequency segments in a frequency division multiplexing environment or time slot segments in a time division multiplexing environment. The system transmits first downstream information from a head end to a router within a first bandwidth segment and transmits second downstream information from the head end to the router within a second bandwidth segment. The router sends the first downstream information to a first destination and sends the second downstream information to a second destination. First upstream information is transmitted from the first destination and through the router to the head end within a bandwidth segment used for downstream transmission other than the first bandwidth segment. Second upstream information is transmitted from the second destination and through the router to the head end within a bandwidth segment used for downstream transmission other than the second bandwidth segment. Upstream information from a given destination is always sent over a different bandwidth from the bandwidth over which the downstream information was received. Further, the router directs respective downstream information to respective EUs while blocking other information to maintain privacy of information.

36 Claims, 6 Drawing Sheets

METHOD AND APPARATUS FOR BANDWIDTH REUSE IN A COMMUNICATION NETWORK

BACKGROUND OF THE INVENTION

1. Field of the Invention

This invention relates to broadband communications and more particular to saving bandwidth in a two-way communication system.

2. Background of Related Art

Generally, in two-way communication systems the total system bandwidth is usually divided into two segments (i.e., frequency bands). Inbound and outbound information each have a dedicated bandwidth. Accordingly, the total bandwidth for a given direction is only half of the overall system bandwidth.

For example, in a point-to-multipoint transmission system such as shown in FIG. 1, the central office or head end (CO/HE) 10 broadcasts downstream information over a single transmission line 102 to remote non-switch splitter 19 that further distributes the information to multiple end users 30, 40, 50, 60 over transmission lines 130, 140, 150, 160, respectively. The end users (EUs) also send upstream signals over the lines 130, 140, 150, 160 to the remote splitter 19 which further forwards that information to CO/HE 10 over the single transmission line 104.

Because of the passive splitting of the splitter 19, all users can receive all the downstream information by tuning to the right channel (frequency, time slot, etc.). Therefore, no privacy can be assured. Also, because each EU uses the same physical line for bi-directional transmissions (lines 130, 140, 150, 160), the downstream and upstream traffic need to be allocated into non-overlapped bands (frequency, time slots, code, or wavelength, etc.). Since no switch function is deployed at remote splitter 19, each EU also needs to follow a certain algorithm (i.e, Frequency Division Multiple Access: FDMA; Time Division Multiple Access: TDMA; Wavelength Division Multiple Access: WDMA; or Code Division Multiple Access: CDMA) to avoid collision with other EU transmission over the shared upstream transmission line 104.

In a system deploying Frequency Division Multiplexing (FDM) for downstream transmission and FDMA for upstream transmission, the bandwidth allocation is shown in FIG. 2. Downstream information $A_D$, $B_D$, $C_D$ and $D_D$ for EUs 30, 40, 50 and 60 are broadcast from CO/HE 10 to remote splitter 19 over single transmission line 102. Downstream information $A_D$ is intended for EU 30, downstream information $B_D$ is intended for EU 40, downstream information $C_D$ is intended for EU 50 and downstream information $D_D$ is intended for EU 60. The remote splitter 19 further distributes all the downstream information to all the EUs. Each EU then tunes to the right frequency band to receive the information that is specifically addressed to that specific EU. For upstream transmission, each EU will transmit its signals in the frequency band that is different from other EUs and also non-overlapped with downstream frequency bands as shown in FIG. 2. For example, the downstream information is grouped into bandwidths having a lower frequency using a low-pass filter while the upstream information is grouped and transmitted in bandwidths having a higher frequency using a high-pass filter. The downstream and upstream bandwidths each generally occupy one-half of the total frequency spectrum.

Based on the same principle, in a system deploying Time Division Multiplexing (TDM) for downstream transmission and TDMA for upstream transmission, the downstream information will be broadcasted to all the EUs (TDM). Each EU will tune to the right time slot to receive its signal. Each EU will use the time slot assigned to this EU for upstream transmission (TDMA). Because single lines 130, 140, 150, 160 are used for both upstream and downstream transmission (assume using same frequency, optical wavelength, or code), Time Division Diplexing (TDD, also called Ping-Pong) may be used to avoid conflict between downstream and upstream traffic.

Two disadvantages of the above systems are the waste of bandwidth resource by allocating the downstream and upstream traffic into two different bands and the loss of privacy.

SUMMARY OF THE INVENTION

A system and method are provided for reusing bandwidth where the total transmission bandwidth is divided into multiple segments. The system and method achieve efficient use of an entire channel and maintain end user privacy.

The method includes the steps of transmitting first downstream information within a first bandwidth segment and second downstream information within a second bandwidth segment. The information is routed to respective first and second destinations. First upstream information is transmitted from the first destination within a bandwidth segment used for downstream transmission other than the first bandwidth segment and second upstream information is transmitted from the second destination within a bandwidth segment used for downstream transmission other than the second bandwidth segment. That is, upstream information from a given destination is sent over a different bandwidth from the bandwidth over which the downstream information was received. Preferably, the first upstream information is transmitted within the second bandwidth segment and the second upstream information is transmitted within the first bandwidth segment.

In a system employing the FDM technique, multiple filters are provided for routing information to and from each destination. In the TDM scenario, clocked switches are provided for routing upstream and downstream information to their destinations.

Other objects, advantages and salient features of the invention will become apparent from the detailed description taken in conjunction with the annexed drawings, which disclose preferred embodiments of the invention.

DESCRIPTION OF THE DRAWINGS

The invention will be described with reference to the following diagrams in which like reference numerals refer to like elements and wherein.

DETAILED DESCRIPTION OF PREFERRED EMBODIMENTS

Figure 1:
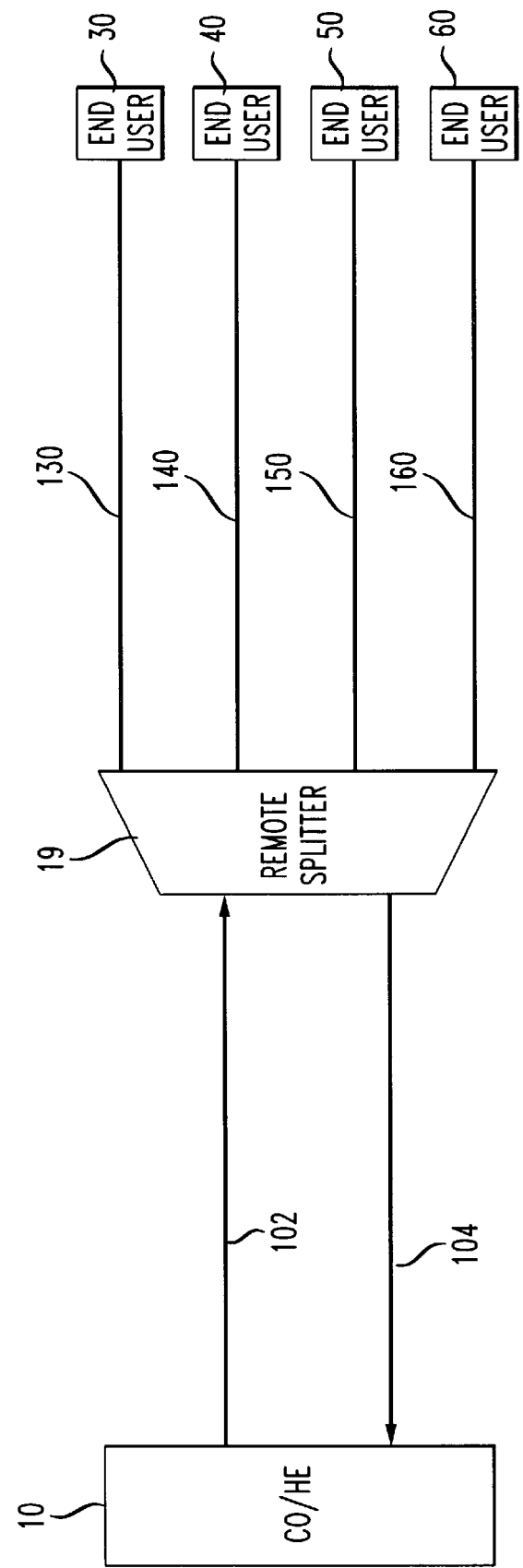
FIG. 1 is a block diagram illustrating a generic system architecture.
Figure 3:
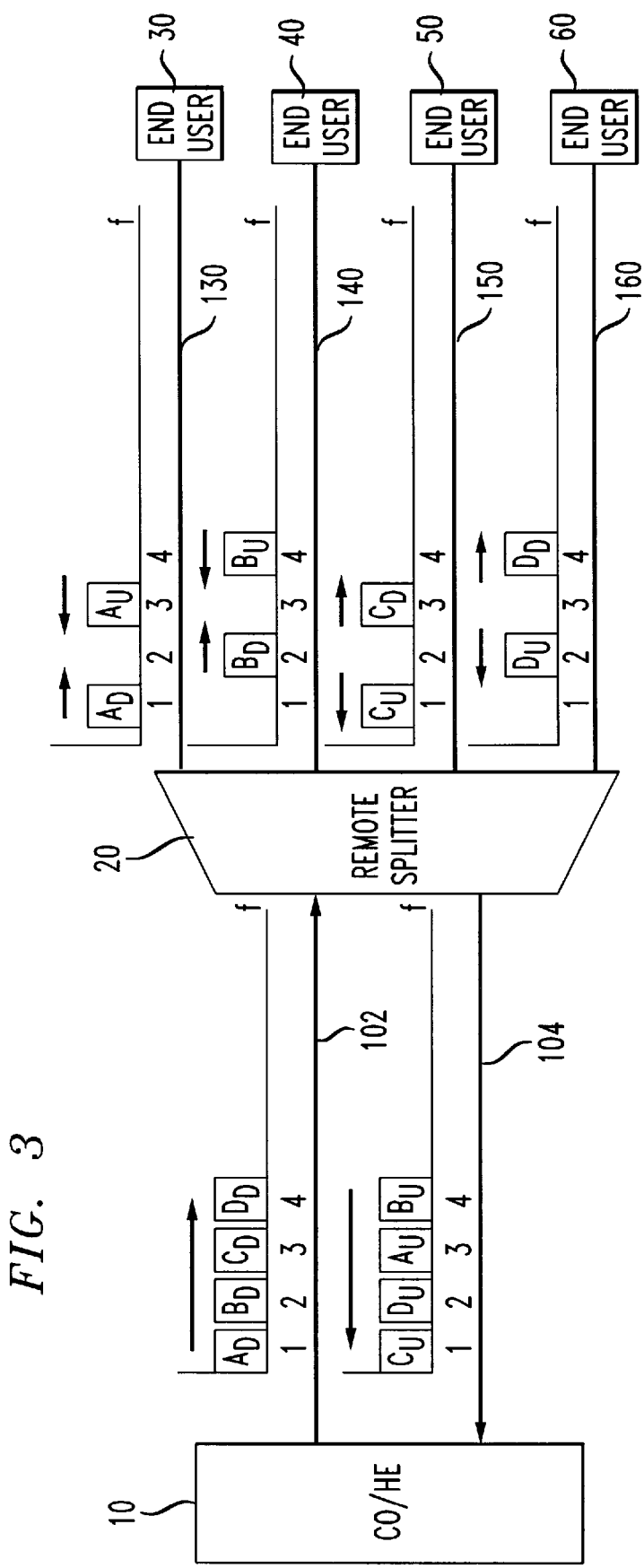
FIG. 3 illustrates an FDM system configuration of the present invention.

A bi-directional transmission system that employs the method and apparatus of the present invention is generally shown in FIG. 3. Elements in FIG. 3 correspond with their like elements in FIG. 1. However, in accordance with the present invention, the remote splitter 19 of FIG. 1 is replaced by remote splitter 20 that will be described later with respect to FIG. 4. In summary, remote splitter 20 operates to send each downstream information to only one specific EU as compared to the remote splitter 19 that sends the downstream information to all of the EUs. When transmitting upstream, only the bandwidth segment that was used for downstream transmission is blocked for that specific EU. Therefore, unlike the prior art that requires one-half of the broadband bandwidth to transmit the upstream information, the present invention transmits upstream information over the full broadband bandwidth. Each upstream information is preferably sent over a bandwidth segment that is different from the downstream bandwidth segment that was used for that specific EU.

Figure 2:
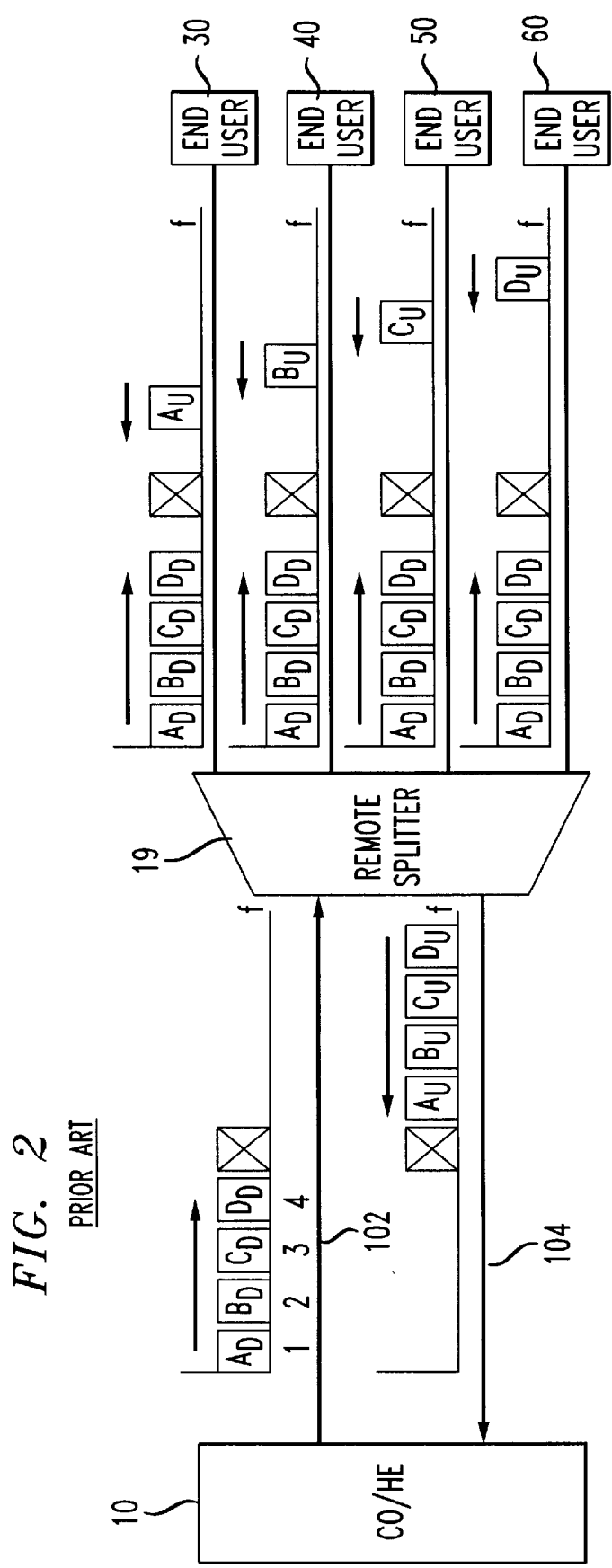
FIG. 2 shows a conventional FDM system.

In particular, a central office (CO/HE) 10 sends a downstream signal along single transmission medium 102 to remote splitter 20. At remote splitter 20, each downstream signal is directed to a specific one of the end users 30, 40, 50 and 60 as compared to all of the end users as described with respect to FIG. 2. End users send upstream signals through remote splitter 20 and over single transmission medium 104 to CO/HE 10.

The generic architecture in accordance with the principles of the present invention using FDM/FDMA is shown in FIG. 3. First downstream information $A_D$ for EU 30 is transmitted along transmission medium 102 within first bandwidth 1. Second downstream information $B_D$ for EU 40 is transmitted along transmission medium 102 within second bandwidth 2. Third downstream information $C_D$ for EU 50 is transmitted within third bandwidth 3 and fourth downstream information $D_D$ for EU 60 is transmitted within fourth bandwidth 4.

Remote splitter 20 directs the downstream traffic such that a first destination 30 only receives the first downstream information $A_D$ within the first bandwidth 1. Second destination 40 only receives second downstream information $B_D$ within second bandwidth 2, third destination 50 only receives third downstream information $C_D$ within third bandwidth 3 and fourth destination 60 only receives fourth downstream information $D_D$ within fourth bandwidth 4. In other words, the remote splitter 20 directs respective downstream information to respective EUs while blocking other information transmitted to this EU. This therefore maintains privacy of each of the EUs.

Because the remote splitter 20 only allows the respective downstream signals to be transmitted to the respective EU over transmission lines 130, 140, 150, 160, the upstream transmission over transmission lines 130, 140, 150, 160 can be arranged such that each EU transmits upstream information within a bandwidth segment which another EU used for downstream transmission.

In particular, first destination 30 preferably transmits first upstream information $A_u$ within third bandwidth 3. Second destination 40 transmits second upstream information $B_u$ within fourth bandwidth 4, third destination 50 transmits third upstream information $C_U$ within first bandwidth 1 and fourth destination 60 transmits fourth upstream information $D_u$ within second bandwidth 2. Alternatively, first destination 30 transmits first upstream information $A_U$, within fourth bandwidth 4 or second bandwidth 2, second destination 40 transmits second upstream information $B_U$, within first bandwidth 1 or third bandwidth 3, third destination 50 transmits third upstream information $C_U$ within second bandwidth 2 or fourth bandwidth 4 and fourth destination 60 transmits fourth upstream information $D_U$ within third bandwidth 3 or first bandwidth 1. As is evident to one skilled in the art, other embodiments of transmitting upstream information are also within the scope of this invention including using more or less than four bandwidths.

With this arrangement, all the EUs' upstream signals will be aligned along frequency (A, B, C, D in bandwidth 3, 4, 1, 2, respectively) after the passive combining at the remote splitter 20, and all of bandwidths 1 through 4 are reused during upstream transmission. Namely, the upstream and downstream traffic each utilize the entire frequency band. Therefore, each direction's bandwidth is doubled as compared to the prior art embodiment shown in FIG. 2 that uses one-half the bandwidth segments for downstream transmission and one-half the bandwidth segments for upstream transmission.

Figure 4:
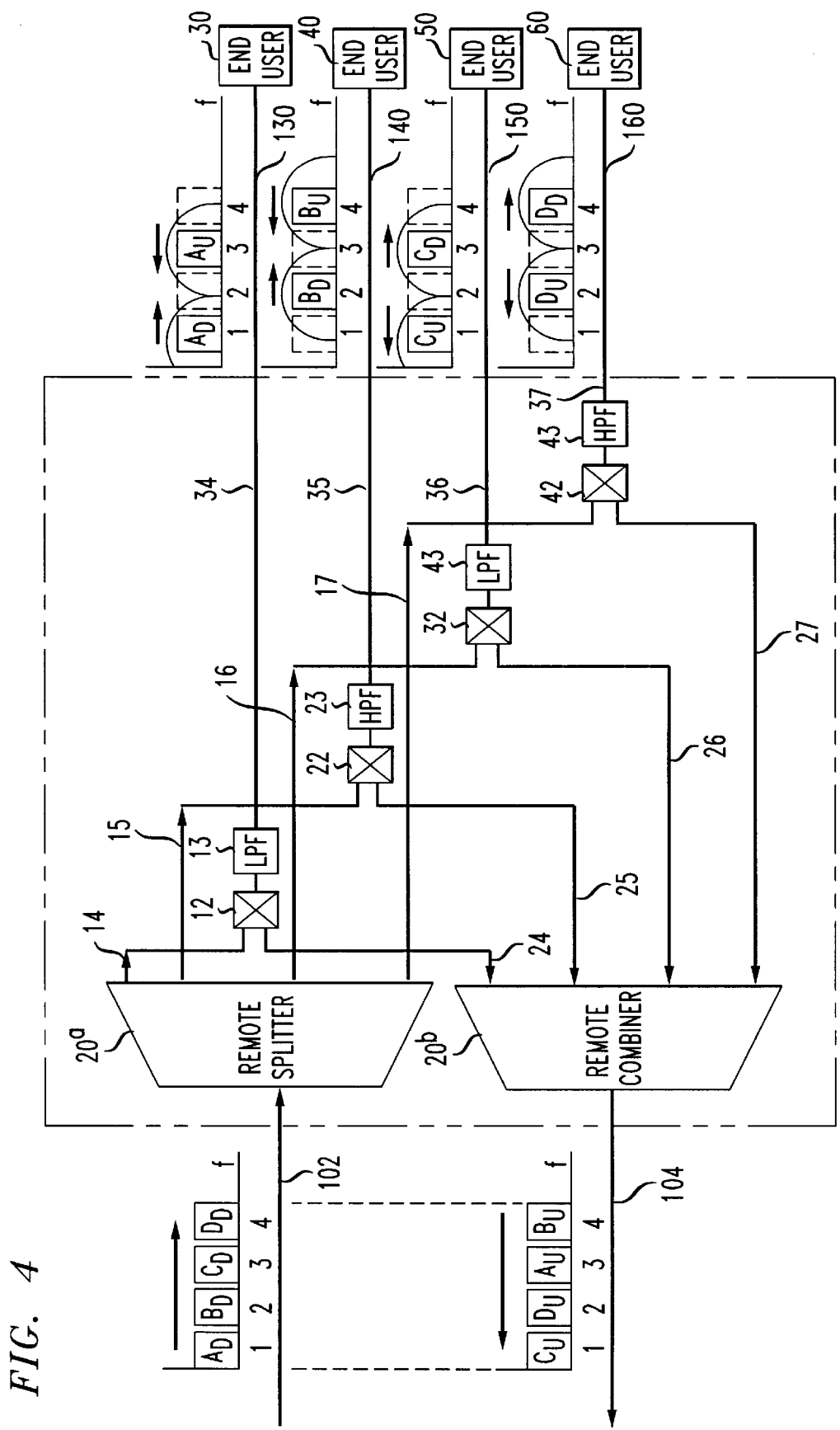
FIG. 4 illustrates a remote splitter used for an FDM embodiment of the present invention.

A remote splitter 20 in an FDM embodiment of the present invention is illustrated in FIG. 4 using filters such as dual-bandpass filters or diplexers with low-high pass or high pass filters. First downstream information $A_D$ is transmitted through remote splitter 20a along path 14 through diplexer 12 and low pass filter 13 and along path 34 to first destination 30. Diplexer 12 and low pass filter 13 are designed to only pass downstream information in the first bandwidth 1 while blocking downstream information transmitted in the other bandwidths. Second downstream information $B_D$ is passed through remote splitter 20a along path 15 through diplexer 22 and high pass filter 23 and along path 35 to second destination 40. Diplexer 22 and high pass filter 23 are designed to only pass downstream information in the second bandwidth 2 while blocking the other downstream information in other bandwidths.

Third downstream information $C_D$ is passed through remote splitter 20a along path 16 through diplexer 32, low pass filter 33 to path 36, which connects with third destination 50. Diplexer 32 and low pass filter 33 only pass downstream information in the third bandwidth 3 while blocking other downstream information. Fourth downstream information $D_D$ is passed through remote splitter 20a, along path 17 to diplexer 42, through high pass filter 43 and along path 37 to fourth destination 60. Similarly, diplexer 42 and high pass filter 43 only pass downstream information in the fourth bandwidth 4 while blocking other downstream information in the other bandwidths.

On the other hand, first destination 30 transmits upstream information along path 34 through low pass filter 13 and through the diplexer 12 along path 24. With diplexer 12 and low pass filter 13, only the signal that is in the third bandwidth 3 can go through. Second destination 40 transmits second upstream information $B_U$ along path 35 through high pass filter 23 although the diplexer 22 along path 25. With diplexer 22 and high pass filter 23, only the signal that is the fourth bandwidth 4 can go through. Third destination 50 transmits third upstream information $C_U$ along path 36 through low pass filter 33 and through diplexer 32 along path 26. With diplexer 32 and low pass filter 33, only the signal that is in the first bandwidth 1 can go through. Finally, fourth destination 60 transmits fourth upstream information Du along path 37 through high pass filter 43 and through the diplexer 42 along path 27. With diplexer 42 and high pass filter 43, only the signal that is in the second bandwidth 2 can go through. Accordingly, the entire spectrum of downstream transmission channels is reused during upstream transmission. However, each user only receives/transmits in select bandwidths. The entire channel is also efficiently used for upstream and downstream transmission. Further, this corrects for problems of privacy as in the related art.

Figure 5:
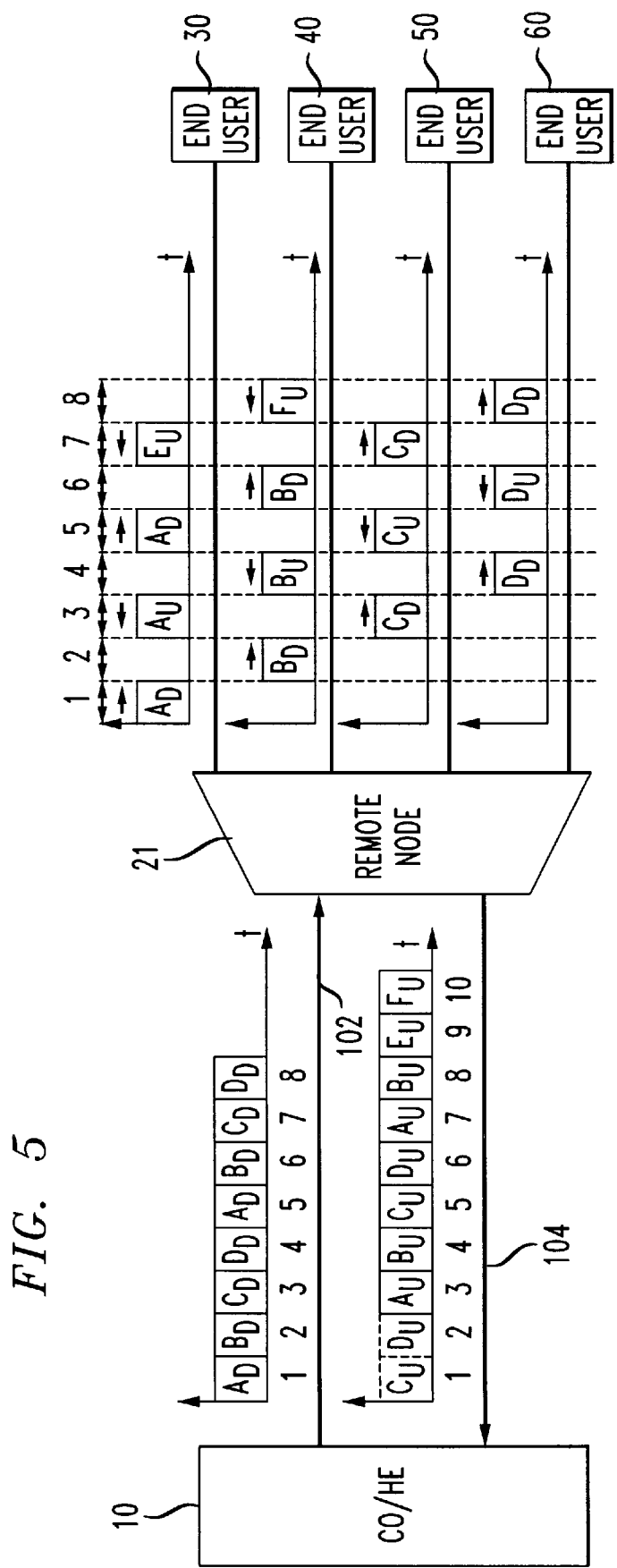
FIG. 5 illustrates a TDM architecture of the present invention.

A TDM/TDMA embodiment in accordance with the principles of the present invention is illustrated in FIG. 5. In the TDM/TDMA embodiment, the blocks 1, 2, 3, 4, 5, 6, 7 and 8 represent time slots. For downstream transmission, TDM is used such that the downstream information is broadcast to remote node 21 with each EU's information allocated in certain time slots. Unlike conventional TDM systems where all the downstream signals are further broadcasted to all the EUs, certain functions, as will be discussed below, are deployed at the remote node 21 such that the respective downstream signals (in certain time slots) are directed to respective EUs. For example, first downstream information $A_D$ is transmitted from CO/HE 10 within first time slot 1 to remote node 21 which then directs it only to first destination 30. Second downstream information $B_D$ is transmitted in time slot 2 to remote node 21 which directs it only to second destination 40. Third downstream information $C_D$ is transmitted in time slot 3 to remote node 21 which then directs it only to third destination 50 and fourth downstream information $D_D$ is directed to only fourth destination 60 within time slot 4. This procedure is further repeated in time slots 5–8 and so on.

Using this type of distribution, first downstream information only gets to first destination 30, second downstream information only gets to second destination 40, third downstream information only gets to third destination 50 and fourth downstream information only gets to fourth destination 60.

For upstream transmission, TDMA is used for multiple EUs (30, 40, 50, 60) to share the common transmission line 104 without using buffer or other multiplexing schemes at remote node 21. Because the directing function of the remote node 21 only allows respective downstream signals (in respective time slots) to go to the respective EUs, the upstream TDMA could be deployed such that one EU can transmit its upstream signals in other EU's downstream time slot. For example, rather than waiting until each destination receives its respective downstream transmission, first destination 30 may begin transmitting first upstream information $A_u$ in time slot 3. Second destination 40 may begin transmitting second upstream information $B_U$ in time slot 4. Third destination 50 transmits third upstream information $C_U$ in time slot 5. Fourth destination 50 transmits upstream information $D_U$ in time slot 6. First destination 30 again transmits upstream information EU in time slot 7. Finally, second destination 40 transmits upstream information $F_U$ in time slot 8. At the remote node 21, the upstream signals are lined up in time, and can be directly transmitted to CO/HE without any buffering. The above described embodiment is not limited to the specifically discussed time slots for each destination. The upstream transmission over transmission lines 130, 140, 150, 160 are arranged such that each EU transmits upstream information within a time slot which another EU used for downstream transmission.

Figure 6:
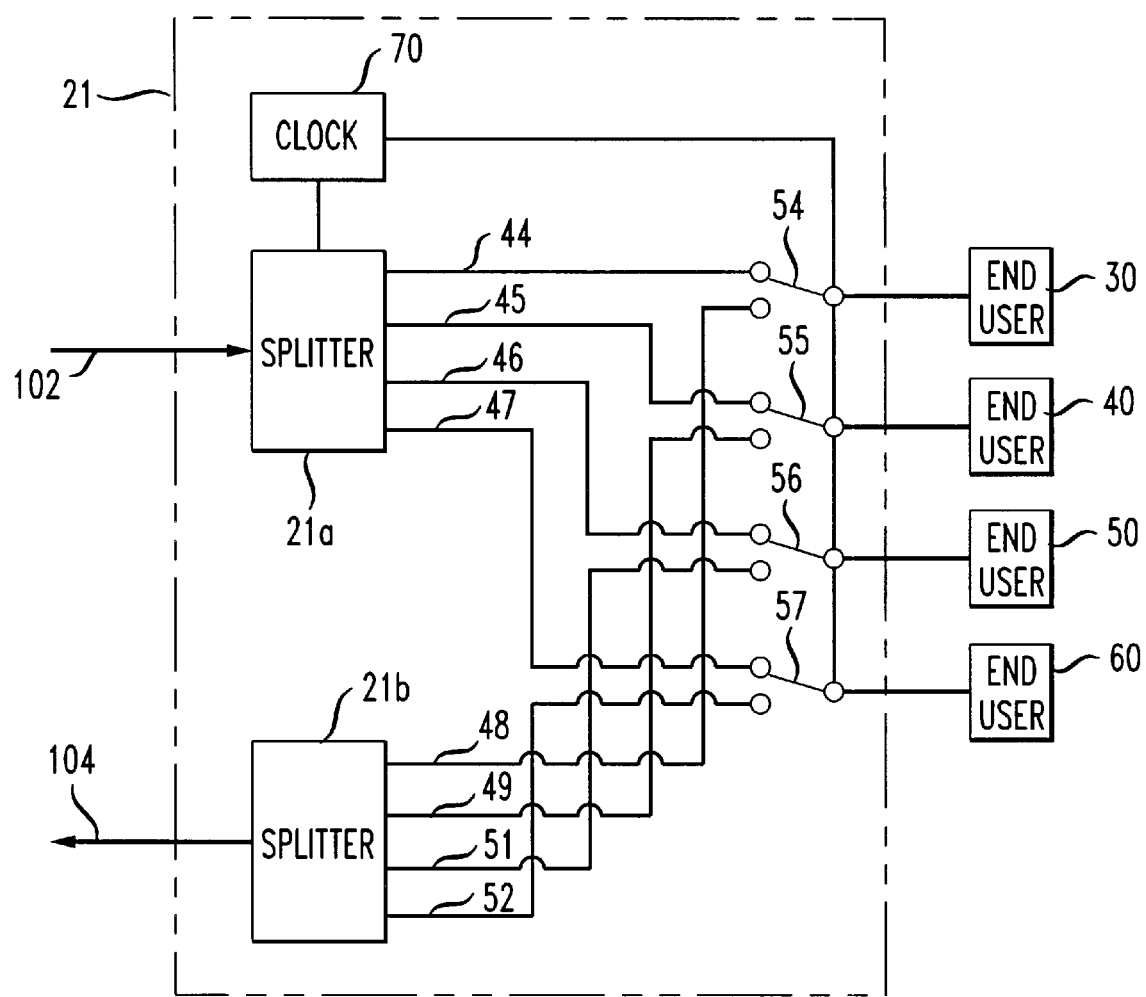
FIG. 6 illustrates the remote splitter for the TDM embodiment.

FIG. 6 illustrates a remote node 21 of the TDM/TDMA embodiment. Clock 70 is either synchronized based on downstream signals or pre-set, and it controls the operation of switches 54–57 such that the information is delivered to the EUs 30, 40, 50 and 60 during the appropriate time slots. First downstream information is transmitted along path 44 from splitter 21a. Switch 54 is closed to the line 44 only during time slot 1 such that information may be transmitted to first destination 30. Second downstream information is transmitted from splitter 21a along path 45 to switch 55, which is closed to line 45 only during time slot 2 such that information can be transmitted to second destination 40. Third information is transmitted along path 46 using switch 56, which is closed to line 46 only during time slot 3 such that information is transmitted to third destination 50. Finally, fourth information is transmitted from splitter 21a downstream along path 47 using switch 57, which is closed to line 47 only during time slot 4 such that information is transmitted to fourth destination 60.

Upstream information may be transmitted during the time slots as indicated with reference to FIG. 5. That is, first upstream information $A_u$ is transmitted through switch 54 to line 48 and to splitter 21b in time slot 3. Second upstream information $B_U$ is transmitted through switch 55 to line 49 and to splitter 21b in time slot 4. Third upstream information $C_U$ is transmitted through switch 56 to line 51 and to splitter 21b in time slot 5. Finally, fourth upstream information is transmitted through switch 57 to line 52 and to splitter 21b in time slot 6.

Accordingly, in the TDM/TDMA embodiment, each user delays the same amount of time (i.e., one time slot) after receiving downstream information until sending upstream information. The bi-directional transmissions are easily synchronized. This is suitable for symmetry bi-directional transmission. For extreme asymmetry, more gap may be needed between two adjacent upstream or downstream time slots.

To achieve dynamic multiplexing, the time slots could be dynamically assigned based on user requests using either in-band or out-band signaling.

In the TDM/TDMA case, we assume that the distance between the remote node 21 and each EU is approximately the same. If there is significantly difference, certain timing or ranging technique should be used to make sure that the upstream signals coming from each EU arrive at the remote node 21 at appropriate times such that there is no overlapping (collision).

In the above-described embodiments, each end user has a dedicated transmission path to the remote splitter 20 or remote node 21. In a shared medium situation, Code Division Multiplexing (CDM) could be combined with FDM/FDMA or TDM/TDMA scheme to separate downstream and upstream transmission.

Combining CDM with FDM/FDMA scheme, the CO/HE transmits downstream signals, coded with one set of code to multiple EUs over the same transmission media using FDM. Each EU transmits its upstream signals using FDMA following the same algorithm as discussed before. All the EU's upstream signals are coded with the same set of code orthogonal to the downstream one. Therefore, the same operation scheme as discussed before can be realized over the shared media while the upstream and downstream can be easily separated by the CO/HE and EU based on the totally different codes. The same algorithm also applies to the TDM/TDMA case.

While this invention has been described in conjunction with specific embodiments thereof, it is evident that many alternatives, modifications and variations will be apparent to those skilled in the art. For example, the function of splitting/combining of 20a and 20b in node 20 of FIG. 4 or 21a and 21b in node 21 of FIG. 6, and the filtering of 12, 13, 22, 23, 32, 33, 42 and 43 or switching of 34, 55, 56 and 57 could be performed in different physical locations. Accordingly, the preferred embodiments of the invention as set forth herein are intended to be illustrative and not limiting. That is, various changes may be made without departing from the scope of the invention as defined in the following claims.

What is claimed is:

1. A method for reusing bandwidth within a system having a total bandwidth divided into multiple segments, the total bandwidth allocated for both upstream and downstream transmission, the method comprising the steps of:

transmitting first downstream information within a first bandwidth segment;

transmitting second downstream information within a second bandwidth segment;

routing the first downstream information transmitted within the first bandwidth segment to a first destination;

routing the second downstream information transmitted within the second bandwidth segment to a second destination; and transmitting first upstream information from the first destination within a bandwidth segment of the total bandwidth used for downstream transmission other than the first bandwidth segment.

2. The method of claim 1, further comprising the step of transmitting second upstream information from the second destination within a bandwidth segment used for downstream transmission other than the second bandwidth segment.

3. The method of claim 2, wherein the first upstream information is transmitted within the second bandwidth segment and the second upstream information is transmitted within the first bandwidth segment.

4. The method of claim 2, further comprising the steps of:

transmitting third downstream information within a third bandwidth segment;

routing the third downstream information transmitted within the third bandwidth segment to a third destination; and transmitting third upstream information from the third destination within a bandwidth segment used for downstream transmission other than the third bandwidth segment.

5. The method of claim 4, further comprising the steps of:

transmitting fourth downstream information within a fourth bandwidth segment;

routing the fourth downstream information transmitted within the fourth bandwidth segment to a fourth destination; and transmitting fourth upstream information from the fourth destination within a bandwidth segment used for downstream transmission other than the fourth bandwidth segment.

6. The method of claim 2, wherein the total bandwidth comprises a frequency range.

7. The method of claim 6, further comprising the steps of:

routing the first downstream and upstream information through a first filter set; and routing the second downstream and upstream information through a second filter set.

8. The method of claim 7, wherein the first and second filter set comprise dual-bandpass filters.

9. The method of claim 7, wherein the first and second filter sets comprise diplexers, low pass filters and high pass filters.

10. The method of claim 2, wherein:

the first downstream information and second downstream information are transmitted from a head end along a first transmission medium; and the first upstream information and second upstream information are received by the head end along a second transmission medium.

11. The method of claim 10, wherein the first downstream information routing step comprises routing the first downstream information from the first transmission medium via a third transmission medium to the first destination, the first upstream information transmitting step comprising transmitting the first upstream information from the first destination via the third transmission medium to the second transmission medium.

12. The method of claim 11, wherein the second downstream information routing step comprises routing the second downstream information from the first transmission medium via a fourth transmission medium to the second destination, the second upstream information transmitting step comprises transmitting the second upstream information from the second destination via the fourth transmission medium to the second transmission medium.

13. The method of claim 2, wherein the total bandwidth comprises a time span.

14. The method of claim 13, further comprising the steps of:

routing the first downstream and upstream information through a first clocked switch; and routing the second downstream and upstream information through a second clocked switch.

15. The method of claim 13, wherein the first downstream information routing step comprises routing the first downstream information in a remote node from a first transmission medium to the first destination based on a clocked switch, and the second downstream information routing step comprises routing the second downstream information in the remote node from the first transmission medium to the second destination based on the clocked switch.

16. The method of claim 15, wherein the first upstream transmitting step comprises transmitting the first upstream information from the first destination to a second transmission medium based on the clocked switch, and the second upstream information transmitting step comprises transmitting the second upstream information from the second destination to the second transmission medium based on the clocked switch.

17. The method of claim 2, wherein the first downstream information, the second downstream information, the first upstream information and the second upstream information are coded information.

18. A system for reusing bandwidth, the system having a total bandwidth divided into multiple segments, the total bandwidth allocated for both upstream and downstream transmission, the system comprising:

a head end that transmits first downstream information within a first bandwidth segment and transmits second downstream information within a second bandwidth segment; and a router that routes the first downstream information transmitted within the first bandwidth segment to a first destination and routes the second downstream information transmitted within the second bandwidth segment to a second destination, and routes first upstream information originating from the first destination to the head end within a bandwidth segment of the total bandwidth used for downstream transmission other than the first bandwidth segment.

19. The system of claim 18, wherein the router routes second upstream information originating from the second destination to the head end within a bandwidth segment used for downstream transmission other than the second bandwidth segment.

20. The system of claim 19, wherein the first upstream information is transmitted within the second bandwidth segment and the second upstream information is transmitted within the first bandwidth segment.

21. The system of claim 19, wherein the total bandwidth comprises a frequency range.

22. The system of claim 21, wherein the router comprises a first filter set that routes the first downstream information to the first destination and its upstream information to the head end and a second filter set that routes the second downstream information to the second destination and its upstream information to the head end.

23. The system of claim 22, wherein the first and second filter sets comprise dual-bandpass filters.

24. The system of claim 22, wherein the first and second filter sets comprise diplexers, low pass filters and high pass filters.

25. The system of claim 19, wherein the head end transmits the first downstream information and the second downstream information from the head end along a first transmission medium; and the first upstream information and the second upstream information are received by the head end along a second transmission medium.

26. The system of claim 25, wherein:

said first downstream information is routed from the first transmission medium via a third transmission medium to the first destination; and the first upstream information is transmitted from the first destination via the third transmission medium to the second transmission medium.

27. The system of claim 26, wherein:

the second downstream information is routed from the first transmission medium via a fourth transmission medium to the second destination; and said second upstream information is transmitted from the second destination via said fourth transmission medium to the second transmission medium.

28. The system of claim 19, wherein the total bandwidth comprises a time span.

29. The system of claim 18, further comprising a first clocked switch that routes the first downstream information to the first destination and a second clocked switch that routes the second downstream information to the second destination.

30. A method for reusing bandwidth in a communication system comprising the steps of:

transmitting downstream information from a node to a first destination within a first bandwidth segment;

transmitting downstream information from said node to at least one other destination within a corresponding at least one other bandwidth segment; and transmitting upstream information from said first destination to said node within one of said at least one other bandwidth segment.

31. The method of claim 30, wherein said bandwidth segments are frequency segments.

32. The method of claim 31, wherein said first bandwidth segment and said one of said at least one other bandwidth segment are separated by one frequency segment.

33. The method of claim 30, wherein said bandwidth segments are time slot segments.

34. The method of claim 33, wherein said first bandwidth segment and said one of said at least one other bandwidth segment are separated by one time slot.

35. The method of claim 30, wherein said downstream information is transmitted at least in part over a shared transmission medium.

36. The method of claim 30, wherein said upstream information is transmitted at least in part over a shared transmission medium.

* * * * *